(12) United States Patent
Jang et al.

(10) Patent No.: US 8,055,220 B2
(45) Date of Patent: Nov. 8, 2011

(54) BROADCAST RECEIVER FOR AND METHOD OF PROVIDING BROADCAST CHANNEL INFORMATION

(75) Inventors: Soo-In Jang, Seoul (KR); Young-Joon Ahn, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 770 days.

(21) Appl. No.: 12/094,134

(22) PCT Filed: Dec. 8, 2006

(86) PCT No.: PCT/KR2006/005320
§ 371 (c)(1),
(2), (4) Date: May 16, 2008

(87) PCT Pub. No.: WO2007/069837
PCT Pub. Date: Jun. 21, 2007

(65) Prior Publication Data
US 2008/0305757 A1    Dec. 11, 2008

(30) Foreign Application Priority Data
Dec. 12, 2005    (KR) .................... 10-2005-0121894

(51) Int. Cl.
*H04B 1/18*    (2006.01)
(52) U.S. Cl. ................... 455/150.1; 455/186.1

(58) Field of Classification Search .................. 455/130, 455/152, 161.1–161.3, 166.1, 184.1, 185.1, 455/186.1–186.2, 150.1, 152.1
See application file for complete search history.

(56) References Cited

U.S. PATENT DOCUMENTS

| 5,428,825 A * | 6/1995 | Tomohiro et al. ........... 455/186.1 |
| 5,535,442 A * | 7/1996 | Kishi .......................... 455/184.1 |
| 6,711,390 B1 * | 3/2004 | Moers ........................ 455/186.1 |
| 2005/0034174 A1 | 2/2005 | Hatanaka | |

FOREIGN PATENT DOCUMENTS

| JP | 10-294903 | 11/1998 |
| JP | 2004-222028 | 8/2004 |
| KR | 2004-79497 | 9/2004 |

* cited by examiner

*Primary Examiner* — Thanh Le
(74) *Attorney, Agent, or Firm* — Staas & Halsey LLP (57) ABSTRACT

A broadcast receiver for and a method of providing broadcast channel information in which a broadcast search list is dynamically created and provided to a user, the broadcast receiver including: a tuner unit to tune a broadcast channel from a plurality of broadcast channels and to output a digital broadcast signal of the tuned broadcast channel; a broadcast signal processing unit to receive service information included in the broadcast signal output by the tuner unit; a storage unit to store the received service information; and a control unit to dynamically create a broadcast search list based on the service information and to generate a screen providing the broadcast search list. Accordingly, it is possible to dynamically change a broadcast search list that provides search information regarding broadcast channels and to provide a user with the dynamically changed broadcast search list.

18 Claims, 5 Drawing Sheets

BROADCAST RECEIVER FOR AND METHOD OF PROVIDING BROADCAST CHANNEL INFORMATION

CROSS-REFERENCE TO RELATED APPLICATIONS

This application claims the benefit of Korean Patent Application No. 2005-121894, filed on Dec. 12, 2005, in the Korean Intellectual Property Office, the disclosure of which is incorporated herein in its entirety by reference.

BACKGROUND OF THE INVENTION

1. Field of the Invention

Aspects of the present invention relate to an apparatus and method for receiving and providing a digital broadcast, and more particularly, to a broadcast receiver for and a method of providing broadcast channel information 2. Description of the Related Art Digital audio broadcasting (DAB) provides a variety of data services (such as weather, traffic, entertainment, and images) in addition to high-quality audio transmissions with Compact Disc (CD)-level sound quality by using sound coding methods that provide a high compression ratio. For example, EUREKA-147 DAB, a DAB standard that is used in Europe, provides audio services with CD-level sound quality and a variety of additional data services by using a high-quality audio compression technology based on Moving Picture Experts Group (MPEG) audio layer II. In contrast, digital multimedia broadcasting (DMB) is a digital broadcasting standard that is more developed than DAB. DMB provides audio, video, and data broadcasting. Furthermore, DMB is classified into terrestrial DMB and satellite DMB, depending upon the transmission method. The DAB standard, such as EUREKA-147, is used for the audio broadcasting of DMB.

In the case of terrestrial DMB, a broadcast receiver scans broadcast channels when a user inputs an input signal requesting the scanning of broadcast channels. Thereafter, the user searches for a desired broadcast channel with reference to broadcast channel information regarding the scanned broadcast channels. The broadcast channel information, however, may not reflect changes in service information that are made between the time when the broadcast channels are scanned and the time when the user searches through the broadcast channels. Therefore, the user may choose a broadcast service that is no longer being provided or may not be able to choose a broadcast service that is newly added after the scanning of the broadcast channels. In addition, service information is displayed to the user only after the scanning of broadcast channels is completed or terminated. Therefore, the user may have to wait a long time for service information to be displayed while the broadcast channels are scanned.

SUMMARY OF THE INVENTION

Aspects of the present invention provide a broadcast receiver for and a method of providing broadcast channel information in which a broadcast search list is dynamically created and search information regarding broadcast channels is provided using the broadcast search list.

Aspects of the present invention also provide a broadcast receiver for and a method of providing broadcast channel information in which ensemble information and service information are provided to a user by countries and/or regions in a broadcast search list to which an ensemble-service tree structure is extended.

According to an aspect of the present invention, there is provided a broadcast receiver including: a tuner unit to tune a broadcast channel from among a plurality of broadcast channels and to output a digital broadcast signal corresponding to the tuned broadcast channel; a broadcast signal processing unit to receive service information included in the digital broadcast signal output by the tuner unit; a storage unit to store the service information received by the broadcast signal processing unit; and a control unit to dynamically create a broadcast search list based on the service information and to generate a screen providing the broadcast search list.

The control unit may control the storage unit such that, if new service information other than the service information stored in the storage unit is received, the new service information is additionally stored in the storage unit, and if service information stored in the storage unit has been stored in the storage unit for a predetermined period of time, the service information is deleted from the storage unit.

The storage unit may store broadcast channel information that is classified by broadcast service provider, and the broadcast channel information may include: country information that identifies a country; region information that belongs to a lower directory than the country information and identifies a region in the country; and ensemble information belongs to a lower directory than the region information and identifies an ensemble provided in the region and channel information regarding one or more channels through which the ensemble is transmitted.

The broadcast receiver may also include a user interface unit to receive a country information selection signal and/or a region information selection signal, wherein the control unit reads the ensemble information corresponding to the country information selection signal and/or the region information selection signal from the storage unit and controls an output of the ensemble information.

The control unit may control the tuner unit to scan a broadcast channel through which an ensemble of the output ensemble of the output ensemble information corresponding to an ensemble information user selection signal received via the user interface unit is transmitted, control the broadcast signal processing unit to receive service information transmitted via the broadcast channel scanned by the tuner unit, and dynamically create the broadcast search list based on the service information received by the broadcast signal processing unit.

The broadcast receiver may also include an output unit to display a screen providing the broadcast search list, wherein the control unit generates the screen providing the broadcast search list using the broadcast channel information, based on country information and/or region information corresponding to the country information selection signal and/or the region information selection signal, ensemble information corresponding to the country information and/or the region information, and the service information received by the broadcast signal processing unit.

The control unit may generate the screen providing the broadcast search list and additional information to indicate whether the service information stored in the storage unit has been scanned.

The control unit may calculate the signal-to-noise ratio (SNR) of an ensemble bitstream generated by the broadcast signal processing unit, determine whether a reception of the ensemble bitstream is above a predetermined level based on the calculated SNR, add generate the screen providing the broadcast search list and a reception state indicating whether the reception of the ensemble bitstream is above the predetermined level.

According to another aspect of the present invention, there is provided a method of providing broadcast channel information, the method including: storing service information transmitted through a digital broadcast channel; dynamically creating a broadcast search list based on the service information; and generating a screen providing the broadcast search list.

According to another aspect of the present invention, there is provided a broadcast search list creating apparatus including: a broadcast signal processing unit to receive service information transmitted through a digital broadcast channel; a storage unit to store the service information received by the broadcast signal processing unit; and a control unit to dynamically create a broadcast search list based on the service information and to generate a screen providing the broadcast search list.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
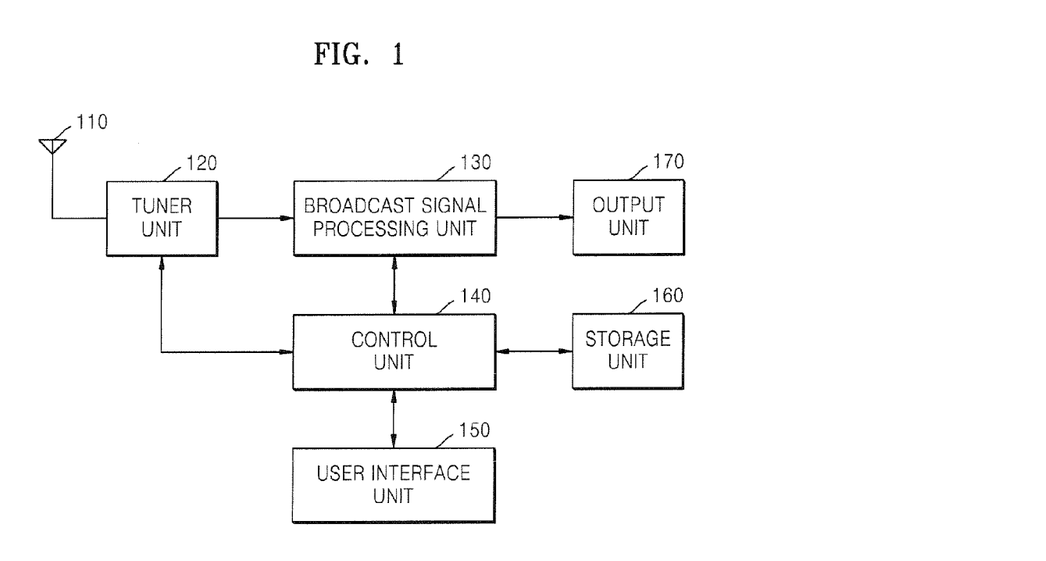
FIG. 1 is a block diagram of a broadcast receiver to provide broadcast channel information according to an embodiment of the present invention.

FIG. 1 is a block diagram of a broadcast receiver for providing broadcast channel information according to an embodiment of the present invention. Referring to FIG. 1, the broadcast receiver includes an antenna 110, a tuner unit 120, a broadcast signal processing unit 130, a control unit 140, a user interface unit 150, a storage unit 160, and an output unit 170.

The tuner unit 120 tunes one of a plurality of broadcast channels. Specifically, the tuner unit 120 outputs one of a plurality of digital broadcast signals received by the antenna 110.

The broadcast signal processing unit 130 receives the digital broadcast signal output by the tuner unit 120, demodulates and/or decodes the received digital broadcast signal, and outputs the demodulated and/or decoded digital broadcast signal to the output unit 170. Also, the broadcast signal processing unit 130 may interpret (or extract and/or convert) service information included in a broadcast signal.

The user interface unit 150 includes a touch screen and/or input devices that can be manipulated by a user (such as buttons). The user interface unit 150 receives a country information signal and/or a region information selection signal or an ensemble selection signal from a user and transmits the received signal to the control unit 140.

The storage unit 160 stores the service information interpreted by the broadcast signal processing unit 130. Furthermore, the storage unit 160 stores broadcast channel information that is classified by broadcast service provider and/or by region. The broadcast channel information classified by broadcast service provider may include country information, region information, and/or ensemble information. The country information is information identifying a country, and the region information is lower-level information as compared to the country information and identifies a region in the country. Ensemble information is lower-level information as compared to the region information and includes information identifying an ensemble that can be provided in the region, and broadcast channel information specifying broadcast channels through which the ensemble can be received. The country information, the region information, and the ensemble information stored in the storage unit 160 may be modified. In addition, country information, region information, and ensemble information other than those already stored in the storage unit 160 may be additionally stored in the storage unit 160 using signals input via the user interface unit 150 and/or via a communication line connected between the broadcast receiver and an external device (not shown).

The output unit 170 includes a speaker and/or a display device (such as a liquid crystal display (LCD) device) and displays a broadcast search list that is dynamically created by the control unit 140.

The control unit 140 controls the tuner unit 120, the broadcast signal processing unit 130, the user interface unit 150, the storage unit 160, and the output unit 170, and dynamically creates a broadcast search list. Specifically, when service information other than the service information stored in the storage unit 160 is received, the control unit 140 may control the storage unit 160 to additionally store the received service information. Also, if the service information stored in the storage unit 160 has not been received for a predetermined period of time, even when the current data reception state is good, the control unit 140 may control the storage unit 160 to delete the service information. Accordingly, the control unit 140 can dynamically create a broadcast search list based on service information additionally stored in or deleted from the storage unit 160.

The control unit 140 receives a country information selection signal and/or a region information selection signal from the user interface unit 150 and controls the reading, from the storage unit 160, of the ensemble information corresponding to country information and/or region information associated with the country information and/or region information selection signal. The control unit 140 controls the output of the read ensemble information to the output unit 170. Thereafter, if an ensemble information user selection signal is received via the user interface unit 150, the control unit 140 controls the tuner unit 120 to scan a predetermined channel from which an ensemble corresponding to the ensemble information user selection signal can be received. Then, the broadcast signal processing unit 130 interprets service information transmitted via the predetermined channel, and the control unit 140 dynamically creates a broadcast search list based on the interpreted service information. Therefore, the control unit 140 can generate a screen providing a broadcast search list that is created based on country information and region information associated with a user selection signal, and ensemble information and service information stored in the storage unit 160 corresponding to the country information and the region information.

The control unit 140 may also generate a screen displaying information that indicates whether the service information stored in the storage unit 160 has been scanned. Moreover, the control unit 140 may calculate the signal-to-noise ratio (SNR) of an ensemble bitstream generated while the broadcast signal processing unit 130 processes a broadcast signal, and may then determine whether the current data reception state is good or bad. Accordingly, the control unit 140 may add current data reception state information to a screen providing a broadcast search list.

Figure 2:
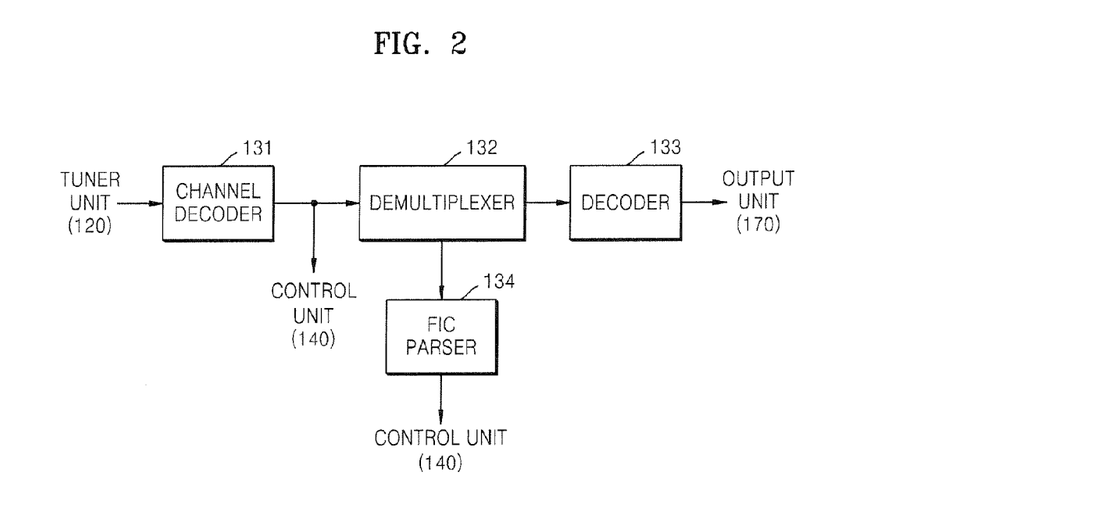
FIG. 2 is a block diagram of a broadcast signal processing unit of FIG. 1.

FIG. 2 is a block diagram of the broadcast signal processing unit 130 of FIG. 1 when the broadcast receiver illustrated in FIG. 1 is a digital multimedia broadcasting (DMB) receiver and digital broadcast signals received by the broadcast receiver are DMB signals. Referring to FIG. 2, the broadcast signal processing unit 130 includes a channel decoder 131, a demultiplexer 132, a decoder 133, and a fast information channel (FIC) parser 134. The channel decoder 131 receives the DMB signal, performs a channel decoding operation on the DMB signal using a predetermined method, and outputs a channel-decoded signal. The demultiplexer 132 demultiplexes the channel-decoded signal provided by the channel decoder 131 and outputs a DMB transport frame 300 (illustrated in FIG. 3) to the decoder 133. The demultiplexer 132 extracts an FIC 330 from the DMB transport frame 300 and outputs the FIC 330 to the FIC parser 134.

The FIC parser 134 parses the FIC 330 and provides fast information group (FIG) information to the control unit 140. For example, the Extension 2 of FIG type 0 (FIG 0/2) may contain basic service organization information. Therefore, the control unit 140 can obtain service information from the FIG information provided by the FIC parser 134 (e.g., FIG 0/2 information). The FIG information will be described later in detail with reference to FIG. 3.

The decoder 133 decodes the DAB transport frame 300 and provides the decoded DAB transport frame 300 to the output unit 170 (such as an LCD and/or a speaker). The decoder 133 may include a plurality of decoding devices, such as one or more audio decoding devices and one or more video decoding devices.

Figure 3:
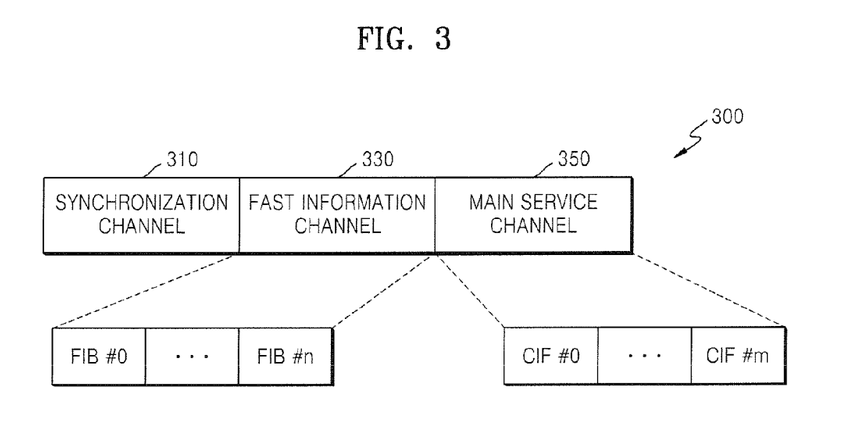
FIG. 3 is a diagram illustrating a format of a DMB transport frame according to an embodiment of the present invention.

FIG. 3 is a diagram illustrating the format of a DMB transport frame 300 according to an embodiment of the present invention. Referring to FIG. 3, the DMB transport frame 300 includes a synchronization channel 310, a FIC 330, and a main service channel (MSC) 350.

The synchronization channel 310 includes null symbols that are used to determine a transport mode, and reference symbols that are used for orthogonal frequency-division multiplexing (OFDM) symbol synchronization or for carrier wave frequency synchronization.

The FIC 330 is a channel for transmitting information that is used by a broadcast receiver to process data (such as service organization information or multiplex format information), and/or to quickly transmit data. The FIC 330 includes multiplex configuration information (MCI) including information regarding the structure of sub-channels, and service information that is additional information regarding services. Therefore, it can be seen from this channel that service data is transmitted via the MSC 350. Furthermore, an application to use the service data may also be indicated in this channel. The FIC 330 includes a fast information data channel (FIDC) including data to be transmitted within a given time. The FIDC may include, for example, simple messages for emergencies.

The FIC 330 includes a plurality of fast information blocks (FIB #0 . . . FIB #n). Each of the FIBs includes a FIB data field and a cyclical redundancy check (CRC) field. The FIB data field includes a plurality of fast information groups (FIGs). A FIG type field specifying the type of predetermined data contained in the FIG data field and a length field specifying the length of the FIG data field are inserted into a header portion of the FIGs, and the actual data is provided in the FIG data field.

The MSC 350 transmits actual content data provided by a service provider. When the space of the FIC 330 is insufficient, some FIC data can be contained in the MSC 350. However, since the MSC 350 employs time interleaving, which may result in delay time for decoding, the MSC 350 may not contain FIC data to be quickly transmitted. The data transmission mode may be a stream mode or a packet mode. The MSC 350 includes a plurality of frames referred to as common interleaved frames (CIFs).

Figure 4:
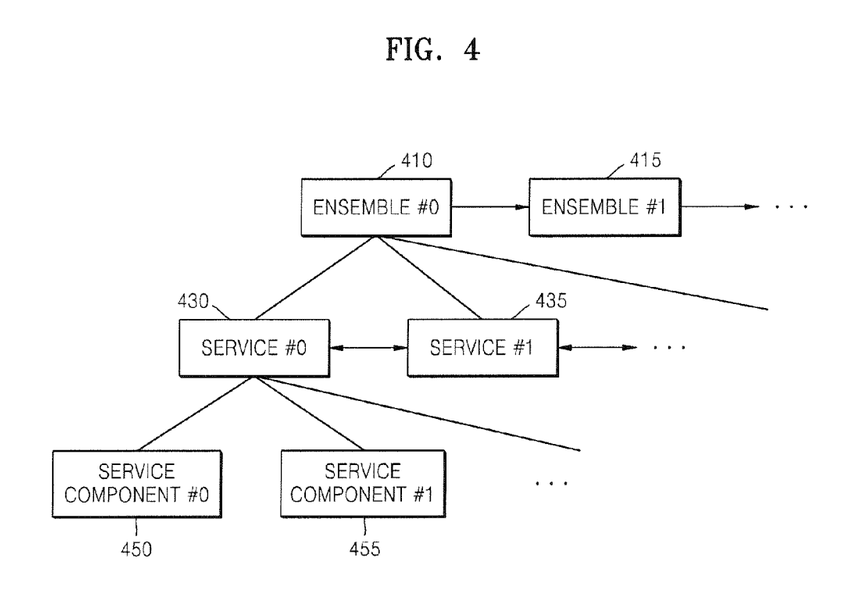
FIG. 4 is a diagram illustrating a multiplex structure of a DMB service according to an embodiment of the present invention.

FIG. 4 is a diagram illustrating a multiplex structure of a DMB service according to an embodiment of the present invention. Referring to FIG. 4, the DMB service has ensembles 410 and 415, services 430 and 435, and service components 450 and 455.

An ensemble refers to a plurality of encoded audio streams and a plurality of data packets that are channel-coded and then multiplexed into one bit stream along with system data. Generally, one broadcasting station provides one ensemble. The service refers to the output that is selected by a user, such as a program service and a data service, and the service components refer to elements constituting a service. The service components of a given service are connected to each other by the multiplex configuration information. The service components are transmitted with the sub channels or the FIDC.

As illustrated in FIG. 4, by way of example, the DMB service includes at least 2 ensembles (ensemble #0 410 and ensemble #1 415). Ensemble #0 410 provides at least 2 services (service #0 430 and service #1 435). Service #0 430 includes at least 2 service components (service component #0 450 and service component #1 455).

A method of providing broadcast channel information, which is performed by a broadcast receiver according to an embodiment of the present invention, will now be described in detail with reference to FIGS. 1, 5, and 6.

Figure 5:
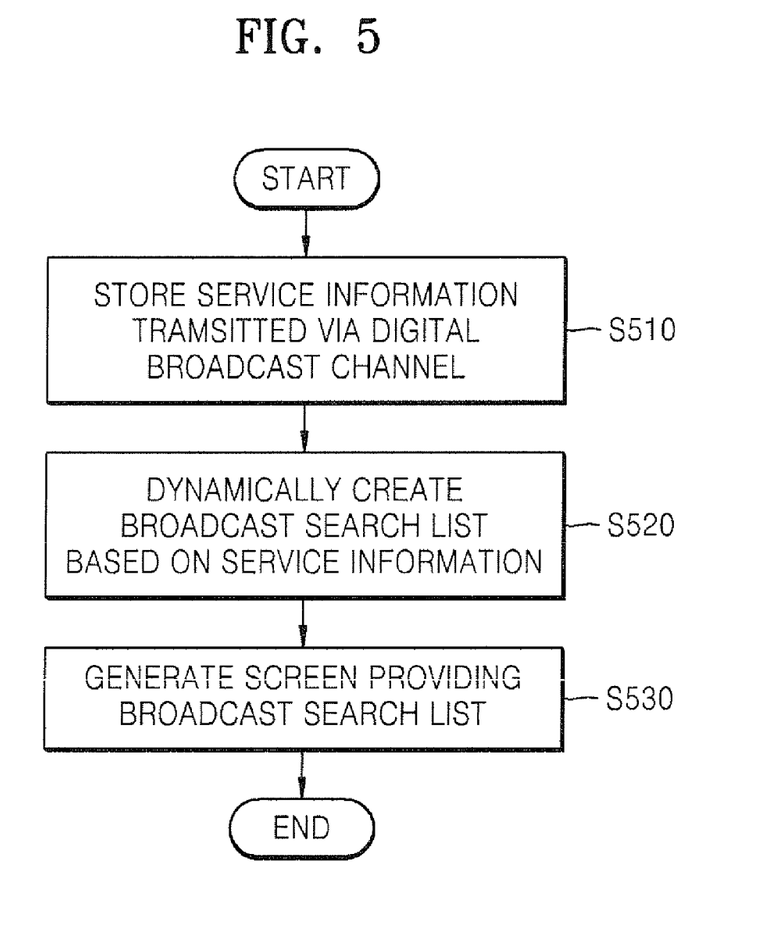
FIG. 5 is a flowchart illustrating a method of providing broadcast channel information according to an embodiment of the present invention.

FIG. 5 is a flowchart illustrating a method of providing broadcast channel information according to an embodiment of the present invention. Referring to FIGS. 1 and 5, the tuner unit 120 outputs a digital broadcast signal via a predetermined channel, and the broadcast signal processing unit 130 interprets service information included in the broadcast signal and transmits the interpreted service information to the control unit 140. For example, the service information may be obtained from fast information group (FIG) 0/2, which is obtained in a parsing operation performed by the FIC parser 134 of the broadcast signal processing unit 130 (illustrated in FIG. 2). In operation S510, the control unit 140 stores the service information transmitted by the broadcast signal processing unit 130 via the predetermined channel in the storage unit 160.

In operation S520, the control unit 140 dynamically creates a broadcast search list based on the service information stored in the storage unit 160. Accordingly, in operation S530, the control unit 140 generates a screen providing the broadcast search list.

If service information other than the service information stored in the storage unit 160 is received, the control unit 140 may additionally store the received service information in the storage unit 160. If the service information stored in the storage unit 160 has not been searched for a predetermined period of time (for example, for 1 minute), even when the data reception state is good, the control unit 140 may delete the corresponding service information from the storage unit 160.

Also, in order to indicate whether service information has been scanned, the control unit 140 may generate scanned state information indicating whether the service information has been scanned, generate a screen providing the scanned state information together with the service information, and provide the generated screen to the output unit 170. For example, for service information that has been previously scanned and stored in the storage unit 160 but has not been scanned within a predetermined period of time, the control unit 140 may generate scanned state information in which the service information is marked as "unscanned." Conversely, for service information that has been scanned within the predetermined period of time and has already been stored in the storage unit 160, the control unit 140 may generate scanned state information in which the service information is marked as "scanned." It is understood that aspects of the present invention are not limited to the above-described generating of scanned state information. For example, the scanned state information may be added to the service information, or a flag in the service information may be set according to whether the service information has been scanned within the predetermined period of time.

Figure 6:
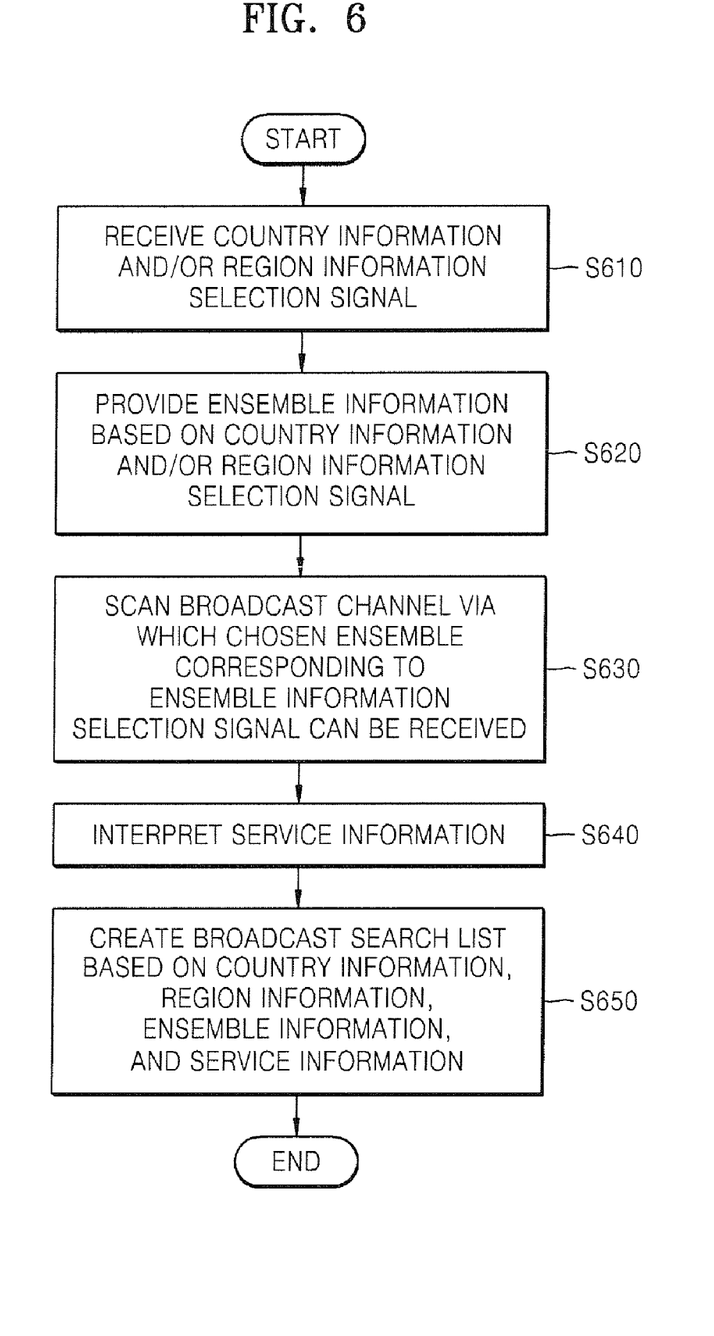
FIG. 6 is a flowchart illustrating a method of providing broadcast channel information according to another embodiment of the present invention.

FIG. 6 is a flowchart illustrating a method of providing broadcast channel information according to another embodiment of the present invention. Referring to FIGS. 1 and 6, in operation S610, a country information selection signal and/or a region information selection signal is received via the user interface unit 150. In operation S620, the control unit 140 reads, from the storage unit 160, ensemble information based on the country information selection signal and/or region information selection signal and provides the read ensemble information to the output unit 170. The control unit 140 may create an ensemble list including one or more portions of ensemble information and provide the ensemble list to the output unit 170.

In operation S630, the control unit 140 controls the tuner unit 120 to scan a predetermined broadcast channel through which a chosen ensemble corresponding to an ensemble information user selection signal received by the user interface unit 150 can be received. Then, a broadcast signal is received via the scanned broadcast channel and is transmitted to the broadcast signal processing unit 130. In operation S640, the broadcast signal processing unit 130 interprets service information included in the broadcast signal by appropriately processing the broadcast signal. Thereafter, the broadcast signal processing unit 130 transmits the interpreted service information to the control unit 140.

In operation S650, the control unit 140 creates a broadcast search list based on the country information and/or the region information associated with the country information selection signal and/or region information selection signal, and ensemble information and service information stored in the storage unit 160 corresponding to the country information and/or the region information, and provides the broadcast search list to the output unit 170. The control unit 140 may generate a screen displaying the broadcast search list including the country information, the region information, the ensemble information, and/or the service information as a tree (as illustrated in FIG. 7).

In the method of providing broadcast channel information according to an embodiment of the present invention, a user can search for an ensemble using different frequencies according to country information and region information. For example, when moving from region A to region B within a country, the user may change the region information of his or her broadcast receiver. Then, the broadcast receiver may scan a channel according to region information corresponding to region A or region information corresponding to region B in order to receive a desired ensemble. In this manner, the user can receive a broadcast service even when moving between regions within a country by scanning a channel that can ensure high-quality ensemble reception by appropriately changing the region information of his or her broadcast receiver.

In addition, the user can receive a broadcast service even when moving from country C to country D by scanning a channel that can ensure high-quality ensemble reception by appropriately changing the country information and region information of his or her broadcast receiver. That is, the user can receive a broadcast service from a channel that can ensure high quality ensemble reception by appropriately changing country information and/or region information. Therefore, there is no need for a GPS device or a CDMA communication module to be additionally installed in the broadcast receiver.

Figure 7:
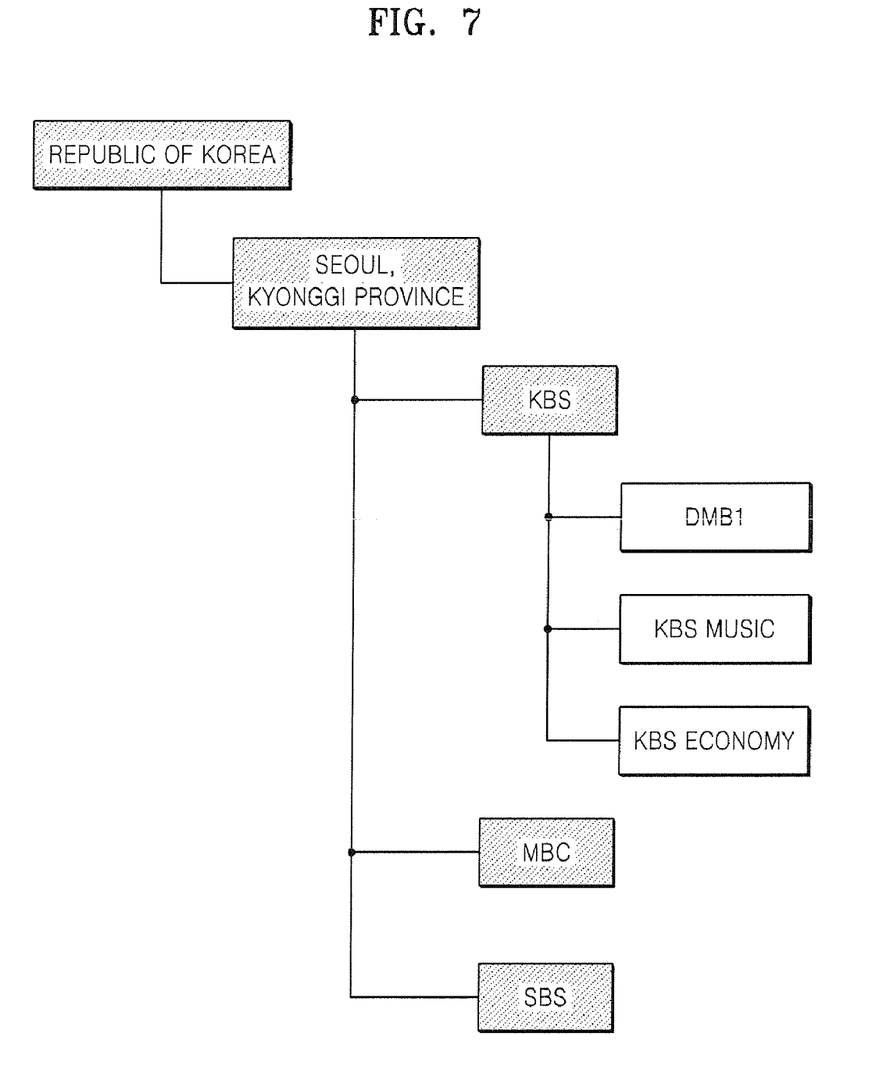
FIG. 7 is a diagram illustrating a screen providing broadcast channel information using a method of providing broadcast channel information according to an embodiment of the present invention.

FIG. 7 is a diagram of a screen providing broadcast channel information using a method of providing broadcast channel information according to an embodiment of the present invention. Referring to FIG. 7, it is possible to provide a user with country information that identifies a country, region information that belongs in a directory of the country information and identifies a region in the country, ensemble information that belongs to a directory of the region information and includes information regarding ensembles that can be serviced within the region, and service information that belongs to a directory of the ensemble information and includes information regarding services included in a predetermined ensemble channel. A list of regions in a country may be displayed in such a manner that information regarding regions closer to a region chosen by the user are displayed closer to the region information corresponding to the region chosen by the user, thereby enabling the user to easily switch to regions near the chosen region from the list.

For example, referring to FIG. 7, if the user chooses South Korea and Seoul, Kyonggi province, a broadcast receiver provides the user with ensemble information corresponding to ensembles that can be received in Seoul, Kyonggi province of the Republic of Korea (i.e., a list including Korea Broadcasting Station (KBS), Munhwa Broadcasting Corporation (MBC), and Seoul Broadcasting Station (SBS)). If the user chooses KBS from the list, the broadcast receiver scans channels through which broadcast programs broadcast by KBS can be received, and provides service information including a list of channels (DMB1, KBS Music, and KBS Economy) as a broadcast search list. Accordingly, it is possible to dynamically create service information by scanning broadcast signals in the aforementioned manner.

Even when moving, for example, from Kyonggi province to Kangwon province, the user can watch digital broadcasts from broadcast channels with high quality reception by enabling the broadcast receiver to scan channels through which broadcast programs broadcast by KBS can be received properly in Kangwon province.

The method of providing broadcast channel information according to aspects of the present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, and an optical data storage. The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art. Aspects of the present invention may also be realized as a data signal embodied in a carrier wave and comprising a program readable by a computer and transmittable over the Internet.

As described above, aspects of the present invention provide a broadcast receiver for and a method of providing broadcast channel information in which a broadcast search list is dynamically changed and displayed to a user.

In addition, aspects of the present invention provide a broadcast receiver for and a method of providing broadcast channel information that can provide a user with various ensemble information and various service information according to a country and/or a region chosen by the user by expanding an ensemble-service tree structure including broadcast service information.

Moreover, according to aspects of the present invention, since a user can search through a variety of ensemble channels by changing country information and/or region information, it is possible for the user to receive broadcast services with high-quality reception even when the user is moving between countries or between regions within a country.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A broadcast receiver of a digital multimedia broadcasting system, the broadcast receiver comprising:
   a tuner unit to tune a broadcast channel from among a plurality of broadcast channels and to output a digital broadcast signals corresponding to the tuned broadcast channel;
   a broadcast signal processing unit to receive service information included in the digital broadcast signal output by the tuner unit;
   a storage unit to store the service information received by the broadcast signal processing unit; and
   a control unit to dynamically create a broadcast search list based on the service information and to generate a screen providing the broadcast search list,
   wherein the control unit controls the storage unit to store new service information, other than the service information already stored in the storage unit, if the new service information is received.

2. The broadcast receiver as claimed in claim 1, wherein the control unit controls the storage unit to delete the service information stored in the storage unit if the service information has been stored in the storage unit for a predetermined period of time.

3. The broadcast receiver as claimed in claim 1, wherein storage unit stores broadcast channel information that is classified by a broadcast service provider, the broadcast channel information comprising:
   country information that identifies a country;
   region information that belongs in a lower directory than the country information and that identifies a region in the country; and
   ensemble information that belongs in a lower directory than the region information and identifies an ensemble provided in the region and channel information regarding one or more channels through which the ensemble is transmitted.

4. The broadcast receiver as claimed in claim 1, further comprising a user interface unit to receive a country information selection signal and/or a region information selection signal, wherein the control unit reads, according to the broadcast channel information, ensemble information corresponding to the country information selection signal and/or the region information selection signal from the storage unit and controls an output of the ensemble information.

5. The broadcast receiver as claimed in claim 4, wherein the control unit controls the tuner unit to scan a broadcast channel through which an ensemble of the output ensemble information corresponding to an ensemble information user selection signal received via the user interface unit is transmitted, controls the broadcast signal processing unit to receive service information included in the broadcast channel scanned by the tuner unit, and dynamically creates the broadcast search list based on the service information received by the broadcast signal processing unit.

6. The broadcast receiver as claimed in claim 5, further comprising an output unit to display the screen providing the broadcast search list,
   wherein the control unit generates the screen providing the broadcast search list, using the broadcast channel information, based on country information and/or region information corresponding to the country information selection signal and/or the region information selection signal, ensemble information corresponding to the country information and/or the region information, and the service information received by the broadcast signal processing unit.

7. The broadcast receiver as claimed in claim 1, wherein the control unit the screen providing the broadcast search list and additional information to indicate whether the service information stored in the storage unit has been scanned.

8. The broadcast receiver as claimed in claim 1, wherein the control unit calculates a signal-to-noise ratio (SNR) of an ensemble bitstream generated by the broadcast signal processing unit, determines whether a reception of the ensemble bitstream is above a predetermined level based on the calculated SNR, and generates the screen providing the broadcast search list and a reception state indicating whether the reception of the ensemble bitstream is above the predetermined level.

9. The broadcast receiver as claimed in claim 1, wherein the storage unit stores broadcast channel information that is classified by a broadcast service provider, the broadcast channel information comprising:
   region information that identifies a geographical region; and
   ensemble information that belongs in a lower directory than the region information and identifies an ensemble provided in the geographical region and channel information regarding one or more channels through which the ensemble is transmitted.

10. A method of providing broadcast channel information, the method comprising:
- storing service information in a storage unit, the service information transmitted through a digital broadcast channel;
- dynamically creating a broadcast search list based on the service information; and
- generating a screen providing the broadcast search list;
- wherein the dynamically creating a broadcast search list comprises storing new service information, other than the service information already stored in the storage unit, if the new service information is received.

11. The method as claimed in claim 10, wherein the dynamic creating of the broadcast search list comprises:
- deleting the service information from the storage unit if the service information has not been updated for a predetermined period of time.

12. The method as claimed in claim 10 further comprising:
- receiving a country information selection signal and/or a region information selection signal via a user interface;
- providing ensemble information corresponding to country information and/or region information associated with the country information selection signal and/or the region information selection signal, the ensemble information identifying an ensemble provided in a country and/or a region identified by the country information and/or the region information;
- scanning a broadcast channel that receives the ensemble according to an ensemble information selection signal; and
- receiving service information included in the scanned broadcast channel.

13. The method as claimed in claim 10, wherein the dynamic creating of the broadcast search list comprises dynamically creating the broadcast search list using the country information and/or the region information corresponding to the country information selection signal and/or the region information selection signal, the ensemble information corresponding to the country information and/or the region information, and the service information.

14. The method as claimed in claim 10, wherein the generating of the screen comprises:
- generating a screen providing the broadcast search list to which scanned state information indicating whether the service information has been scanned is added.

15. The method as claimed in claim 10, wherein the generating of the screen comprises:
- generating the screen to provide the broadcast search list and a reception state indicating a current broadcast signal reception state.

16. A computer-readable recording medium storing a computer program for executing the method of claim 10.

17. A broadcast search list creating apparatus comprising:
- a broadcast signal processing unit to receive service information transmitted through a digital broadcast channel;
- a storage unit to store the service information received by the broadcast signal processing unit; and
- a control unit to dynamically create a broadcast search list based on the service information and to generate a screen providing the broadcast search list,
- wherein the control unit controls the storage unit to store new service information, other than the service information already stored in the storage unit, if the new service information is received.

18. The apparatus as claimed in claim 17, further comprising a user interface unit to receive a country information selection signal and/or a region information selection signal, wherein:
- the control unit reads ensemble information corresponding to country information and/or region information associated with the country information selection signal and/or the region information selection signal;
- the ensemble information identifies an ensemble provided in a country and/or a region identified by the country information and/or the region information;
- the control unit determines a broadcast channel that receives the ensemble; and
- the broadcast signal processing unit receives the service information transmitted through the determined broadcast channel.

* * * * *

UNITED STATES PATENT AND TRADEMARK OFFICE
CERTIFICATE OF CORRECTION

PATENT NO.         : 8,055,220 B2                                      Page 1 of 1
APPLICATION NO.    : 12/094134
DATED              : November 8, 2011
INVENTOR(S)        : Soon-In Jang It is certified that error appears in the above-identified patent and that said Letters Patent is hereby corrected as shown below:

Column 10, Line 1, In Claim 3, after "wherein" insert -- the --.

Column 10, Line 45, delete "unit" and insert -- unit generates --, therefor.

Signed and Sealed this
Fourteenth Day of February, 2012

David J. Kappos
*Director of the United States Patent and Trademark Office*